US008631848B2

(12) United States Patent
Hladilek et al.

(10) Patent No.: US 8,631,848 B2
(45) Date of Patent: Jan. 21, 2014

(54) APPARATUS AND METHOD FOR PRODUCING WATERPROOF STRUCTURAL CORRUGATED PAPERBOARD

(76) Inventors: Michael B. Hladilek, Phillips, WI (US); Carl R. Marschke, Phillips, WI (US)

( * ) Notice: Subject to any disclaimer, the term of this patent is extended or adjusted under 35 U.S.C. 154(b) by 252 days.

(21) Appl. No.: 13/047,218

(22) Filed: Mar. 14, 2011

(65) Prior Publication Data

US 2011/0162793 A1 Jul. 7, 2011

Related U.S. Application Data

(63) Continuation-in-part of application No. 12/558,809, filed on Sep. 14, 2009, now Pat. No. 7,998,300.

(51) Int. Cl.
*B32B 37/06* (2006.01)
*B31F 1/24* (2006.01)

(52) U.S. Cl.
USPC ........... 156/499; 156/205; 156/210; 156/472; 264/236; 264/286; 425/71

(58) Field of Classification Search
USPC ......... 156/205, 206, 207, 208, 210, 470, 471, 156/472, 473, 499; 264/236, 286; 425/71
See application file for complete search history.

(56) References Cited

U.S. PATENT DOCUMENTS

| | | | |
|---|---|---|---|
| 2,416,232 | A | 2/1947 | Soday |
| 2,728,567 | A | 12/1955 | Farnworth et I |
| 3,402,068 | A | 9/1968 | Wilkins |
| 4,285,749 | A | 8/1981 | Stiles |
| 4,701,488 | A | 10/1987 | Williams |
| 4,976,993 | A | 12/1990 | Sutera |
| 5,619,806 | A | 4/1997 | Warren |
| 5,891,302 | A | 4/1999 | Marschke |
| 7,459,049 | B2 | 12/2008 | Marschke |
| 7,770,342 | B2 | 8/2010 | Marschke |
| 2008/0020080 | A1 | 1/2008 | Marschke |

FOREIGN PATENT DOCUMENTS

| | | |
|---|---|---|
| EP | 0826486 | 3/1998 |
| JP | 458799 | 3/1970 |

OTHER PUBLICATIONS

International Search Report and Written Opinion dated Mar. 4, 2011.

*Primary Examiner* — William Bell
(74) *Attorney, Agent, or Firm* — Andrus, Sceales, Starke & Sawall, LLP

(57) ABSTRACT

Two paper webs saturated with an A-phase phenolic resins and dried to a B-phase are conveyed through separate low melting point metal alloy baths, one web after being corrugated, to convert the resin to a fully cured C-phase, whereafter the webs are joined to form a waterproof single face corrugated web.

7 Claims, 4 Drawing Sheets

APPARATUS AND METHOD FOR PRODUCING WATERPROOF STRUCTURAL CORRUGATED PAPERBOARD

CROSS REFERENCE TO RELATED APPLICATION

This is a continuation-in-part of U.S. patent application Ser. No. 12/558,809, filed Sep. 14, 2009, now U.S. Pat. No. 7,998,300.

BACKGROUND OF THE INVENTION

The present invention relates to the manufacture of corrugated paperboard for use in structural applications in which waterproofing is imperative. More particularly, the invention pertains to a method and apparatus for converting corrugated media and liner webs impregnated with an A-phase phenolic resin and dried to a partially cured B-phase to produce a fully cured C-phase waterproof single face corrugated web.

U.S. patent application Ser. No. 11/769,879, filed on Jun. 28, 2007, which is incorporated herein by reference, describes a method and apparatus for manufacturing open core elements from paperboard webs for applications which might include exposure to water and high humidity. In such applications, the paperboard web must be treated to prevent damage and loss of strength in the presence of water. The hollowcore elements produced in accordance with the above identified patent lend themselves to many structural applications, including relatively narrow structures such as doors and much wider and deeper structures such as walls, decks, floors and beams.

One advantage of the method described in the above identified application, in addition to the broad flexibility of the process, is the high output attainable by the unique method for laying up the open core elements. If a waterproof paperboard web is required, it is important that the waterproofing process is fast and accurate enough to fit into the lay-up process without loss of time and quality.

SUMMARY OF THE INVENTION

A paper web may be waterproof by impregnation with a liquid phenolic resin, followed by drying and curing. The phenolic resin may be a phenol-formaldehyde which is applied in liquid form, sometimes referred to as the A-phase (or stage) and then dried and cured. Because the phenolic resin is a thermoset, the A-phase saturated web is first dried by heating to a B-phase in which the resin is partially cured. In the B-phase, the web retains substantial flexibility permitting it to be converted, e.g. corrugated. After conversion, the web is cured at a higher temperature to a fully cured C-phase in which the resin becomes more rigid, hard and insoluble. The fully cured C-phase web is thereafter much more difficult to manipulate, but is fully waterproof and structurally rigid.

In accordance with the basic method of the present invention, a method for curing a paper web impregnated with an A-phase liquid phenolic resin (such as phenol-formaldehyde) and dried to a B-phase resin includes the steps of: (1) corrugating the partially cured B-phase paper web between upper and lower fluting conveyors; (2) providing a bath of a low melting point metal alloy that is hot enough to convert the resin to a fully cured C-phase; (3) maintaining the corrugated web in contact with the underside of the upper fluting conveyor; (4) carrying the web through the bath to provide direct contact of a web face with the metal alloy, and (5) maintaining contact of the web with the molten alloy for a time sufficient to convert the resin to the C-phase. The conveying step may comprise immersing the web completely in the molten alloy bath. Preferably, the conveying step comprises (1) providing the bath with opposite side walls that define coplanar upper edges, and upstream and downstream end walls that have upper edges below the upper edges of the side walls, and (2) conveying the web on the underside of the conveyor in a path between the side walls and over the end walls. Preferably, the method includes the step of sealing the interface between the lateral edges of the conveyor and the side walls.

In another aspect of the invention, the B-phase web is corrugated prior to conveying the web through the molten alloy bath. The corrugating step comprises carrying the web between upper and lower fluting conveyors having interengaging fluting bars. In accordance with this aspect of the invention, the corrugated web is maintained on the upper fluting conveyor for travel through the bath. The method also includes the steps of (1) conveying a paper liner web that is impregnated with an A-phase phenolic resin dried to a partially cured B-phase through a molten alloy bath to convert the phenolic to a fully cured C-phase, and (2) joining the converted corrugated web to the converted liner web to form a composite single face web. The joining step preferably comprises (1) applying an adhesive to the flute tips of the corrugated web, and (2) pressing the liner web against the flute tips.

The present invention also includes an apparatus for curing a fluted paper web that is impregnated with an A-phase phenolic resin and dried to a partially cured B-phase, the apparatus comprising a heated bath for holding a molten low melting point metal alloy, the bath having a bottom wall, opposite side walls extending vertically upward from the bottom wall and defining upper edges of the bath, an upstream alloy supply header that extends between the side walls and has a horizontal upper edge below the upper edges of the side walls and defines a molten metal distribution reservoir. A downstream weir dam has an upper edge that is coplanar with the upper edge of the supply header and defines a trough for receiving molten metal alloy overflowing the weir dam. A pump supplies the molten metal alloy to the upstream supply header and returns molten metal to the header from the downstream trough in a closed circuit. A web conveyor including a plurality of interconnected articulated flights that are shaped to form and adapted to carry the fluted web on the underside thereof to run through the molten metal bath between the side walls and over the upper edges of the supply header and the weir dam.

The molten metal distribution reservoir preferably comprises an inlet for molten metal alloy that is centered between the side walls of the bath, and a distribution manifold that is adapted to equalize the distribution of the molten alloy returned by the pump laterally across the length of the manifold. The distribution manifold preferably has a symmetric pattern of alloy feed holes that extend laterally in opposite directions from the center inlet. The conveyor flights may be heated to preheat the incoming web. The flights preferably comprise aluminum extrusions. A continuous sealing strip is provided between the side walls and the lateral edges of the conveyor to inhibit leakage of the molten metal alloy. The sealing strips preferably comprise low friction plastic strips that are attached to the side wall.

An embodiment of the present invention is an apparatus for making a waterproof corrugated single face web from two paper webs that are impregnated with an A-phase phenolic resin and dried to a partially cured B-phase. The apparatus comprises a corrugator for one of the webs that has a pair of interengaging upper and lower conveyors, each of which has a plurality of interconnected articulated flights shaped to form a corrugated web from the web carried therebetween. The web 10, with the phenolic resin in the B-phase, is quite flexible and readily corrugated. A low melting point alloy bath in the path of the upper conveyor provides direct contact of the alloy with the corrugated web on the upper conveyor sufficient to convert the resin to a fully cured C-phase. A heater is also provided for heating the other paper web to a temperature sufficient to convert the resin to the C-phase. A single facer is provided to join the converted corrugated web and the other web to form the single face web. The heater for the other web preferably comprises another low melting point alloy bath and a separate conveyor to immerse and carry the other web through the second bath.

Another aspect of the present invention is a method for making a rigid waterproof corrugated single face paper web from a continuous medium web and a continuous liner web, the method comprising (1) separately running each of the medium and liner webs on respective medium and liner infeed devices, (2) moving the webs through a bath of an A-phase liquid phenolic resin to coat the webs with the resin, (3) transferring each of the running coated webs from the resin bath into and through a drying zone to convert the resin to a dry B-phase, (4) from the drying zone, directing the dry medium web between upper and lower fluting conveyors, (5) maintaining the corrugated medium web on the underside of the upper fluting conveyor, (6) conveying the corrugated web in contact with a heated bath of a low melting point metal alloy to provide contact of the exposed face of the corrugated web with the metal alloy to convert the resin to a cured C-phase, (7) directly the dry liner web from the drying zone through a heated bath of a low melting point molten metal alloy to convert the resin to a cured C-phase, (8) applying a waterproof adhesive to the exposed flute tips of the cured corrugated medium web, and (9) pressing the cured liner web against the adhesive on the flute tips to join the liner and medium webs. Preferably, the pressing step is performed while the medium web is held on the upper fluting conveyor.

In the foregoing method, each of the infeed devices may comprise a pair of web supporting rolls under the running web and a pair of vertically translatable web positioning rolls between and parallel to the support rolls and over the running web in a thread-up position, the moving step comprising translating the pair of positioning rolls and the running web from the thread-up position to a coating position in the resin bath between an upstream untreated web input run and a downstream coated web output run. The drying zone may comprise heating devices positioned on opposite sides of the coated web output run. The transferring step includes contacting opposite coated web faces with a squeegee device positioned upstream of the heating devices to remove excess liquid resin. The heating devices may comprise infrared heaters and, preferably, include forced air fans. The method may also include the step of positioning the heating device for the inside face of the coated web laterally away from the running web in the thread-up position, and moving the heating device for the inside face of the coated web laterally into a drying position after the translating step. Preferably, the positioning and moving steps are performed on both faces of the coated web.

A broadly defined and comprehensive apparatus for making a rigid waterproof corrugated single face paper web from a continuous running medium web and a continuous running liner web comprises: a web infeed device that includes a pair of web supporting rollers under the running web; a pair of positioning rolls mounted between and parallel to the supporting rolls and over the running web in a thread-up position; a bath of an A-phase liquid phenolic resin supported below the positioning rolls; a vertical translating device mounting the positioning rolls for movement with the running web from the thread-up position to a coating position in the resin bath between an upstream untreated web input run and a downstream coated web output run; a drying zone that includes heating devices positioned on opposite sides of the coated web output run; a horizontal translating device that mounts the heating devices for movement into the drying zone with the web in the coating position; a corrugator for the dry medium web from the drying zone; a first heated bath of a low melting point metal alloy that provides direct curing contact with the running corrugated medium web; a second heated bath of a low melting point metal alloy that provides direct curing contact with the dry liner web; and, a single facer for joining the cured medium web and the cured liner web. Preferably, the heating devices comprise infrared heaters and forced-air fans. The drying zone includes a squeegee device positioned in contact with the coated web faces upstream of the heating devices. Preferably, the squeegee device is mounted on and carried with the horizontal translating device.

DETAILED DESCRIPTION OF THE PREFERRED EMBODIMENT

Figure 1:
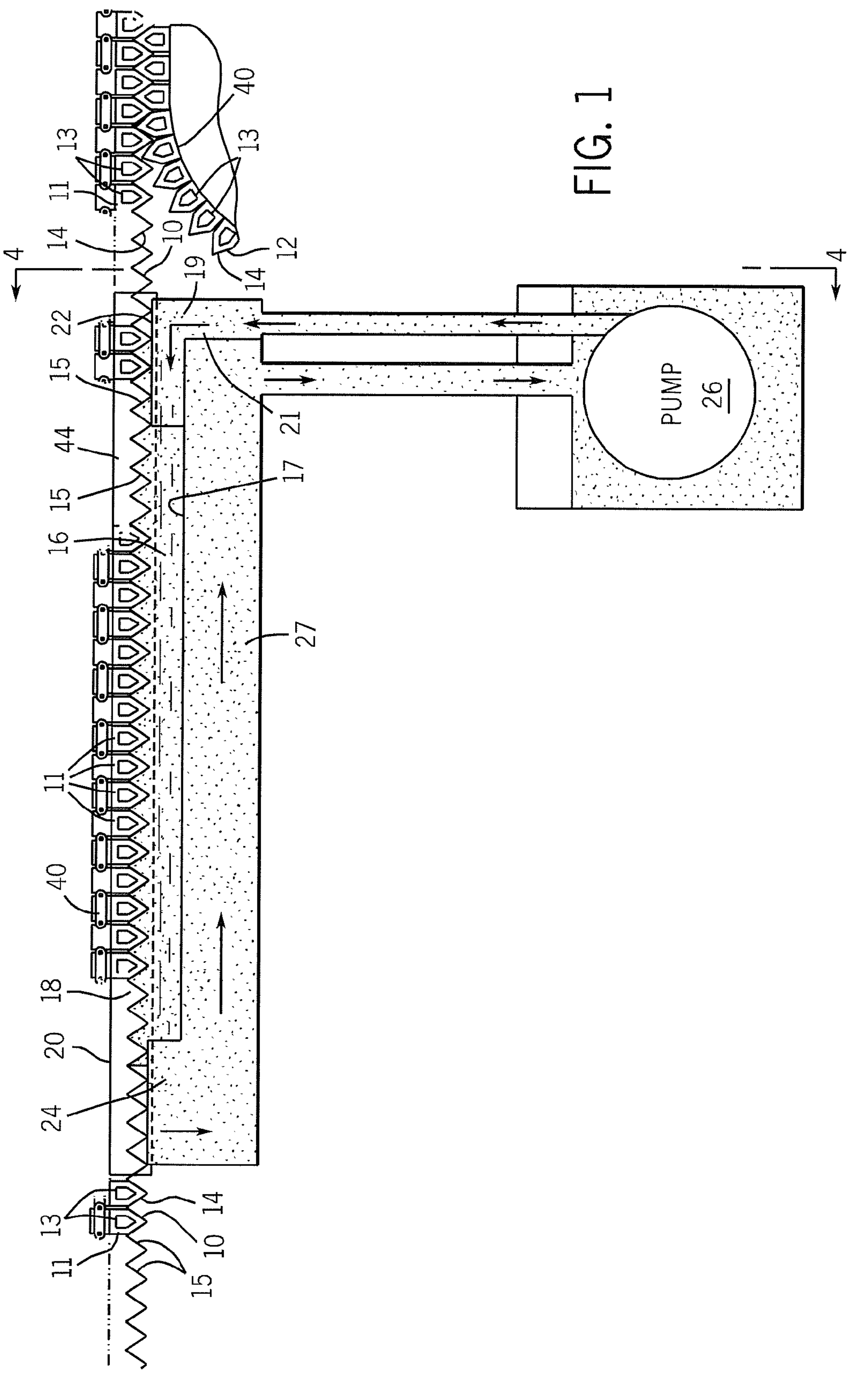
FIG. 1 is a side elevation schematic of the curing apparatus for a corrugated paper web.

Referring initially to FIG. 1, a corrugated medium web 10 made from a paper web impregnated with an A-phase liquid phenolic resin that is first dried to a partially cured B-phase, and then heated to a curing temperature sufficient to convert the B-phase to a fully cured C-phase in which the web is waterproof. The C-phase cured web also becomes substantially more stiff and severe bending of the web is thereafter restricted. In the dried partially cured B-phase, the web 10 is still quite flexible. However, web stiffness is an important characteristic of the cured corrugated web and the treated liner web to which it is attached, as will as discussed below, for processing in accordance with the method of open core element manufacturing disclosed in the above identified copending application.

In the embodiment shown, the B-phase medium web 10 is corrugated between interengaging upper and lower corrugating conveyors 11 and 12, respectively. Each of the conveyors 11 and 12 comprises a belt of interconnected articulated flights 13 that have flute-forming teeth 14 to provide flutes of a desired depth and pitch. For example, flutes having a pitch of ¾ in. (19 mm) and a depth of ½ in. (13 mm) are satisfactory. The flights, preferably of aluminum, may be heated to minimize heat loss in the treatment bath to be described.

A heated bath 16 is positioned to receive the B-phase corrugated medium web 10 after it is formed, and the lower corrugating conveyor 12 is directed away from the web and downwardly in a return run. The corrugated web 10 is retained on the underside of the upper corrugating conveyor 11 where the web flutes 15 remain in intimate contact with the teeth 14 of the conveyor flights 13.

The bath 16 contains a low melting point metal alloy that is used to heat the web 10 and cure the phenolic resin to the C-phase as it passes through the bath 16 in contact with the molten alloy. One particularly well suited alloy is a 60/40 bismuth-tin alloy which is heated to about 400° F. (about 200° C.). Electric resistance heating may be used to maintain the bath temperature, but other heat sources, such as infrared or direct flame heating, may also be used. The bath has a generally horizontal bottom wall 17, enclosed laterally by a pair of side walls 18 defining coplanar upper edges 20. The upstream end of the bath is defined by an alloy supply header 21 that extends between the side walls 18 and has a horizontal upper edge 22 that is lower than the upper edges 20 of the side walls. The supply header 21 defines a molten metal distribution reservoir 23 for the uniform supply of molten alloy. The downstream end of the bath 16 is defined by a weir dam 24 that has a horizontal upper edge 25 that lies generally coplanar with the upper edge 22 of the upstream supply header 21. The weir dam 24 defines an open slot 29 for receipt of the molten metal alloy that overflows the weir dam.

The molten metal is circulated through the bath in a closed circuit including a pump 26 receiving molten metal flowing into the slot 29 in the weir dam 24 and returning it to the alloy supply header 21 where it is distributed evenly and uniformly across the upstream end of the bath and downstream of the upstream end wall 19.

In operation, the corrugated medium web 10 is carried by the upper conveyor 11 such that the tips of the flutes 15 slide over the upper edge 22 of the upper end wall and into contact with the molten alloy. The alloy in the bath is forced by pump pressure up into the flutes on the conveyor teeth 14. Pump pressure is adjusted to provide sufficient head to fill the web flutes, preferably with a slight over-pressure to assure the underside of the fluted web 10 is fully contacted by the molten alloy. Movement of the conveyor causes the flutes to assist in carrying the alloy downstream and over the weir dam 24. This action assures that the corrugated medium web 10 carried on the conveyor 11 is fully contacted by the molten alloy. This, in turn, assures that the entire web 10 is heated sufficiently to convert the phenolic to the cured C-phase. As the upper conveyor 11 and attached corrugated web 10 reach the downstream end of the bath, the flutes 15 engage and slide over the upper edge 25 of the weir dam 24 and the alloy drops into the slot 29 and travels through return passages 28 in the side walls 18 of the bath by operation of the pump 26.

With a medium paper web 10 saturated with about 15% by weight of an A-phase liquid phenolic dried to be B-phase, the web is fully cured to the C-phase if it is retained in a bath of alloy at the indicated temperature of about 400° F. (about 200° C.) for about 4 seconds.

Figure 2:
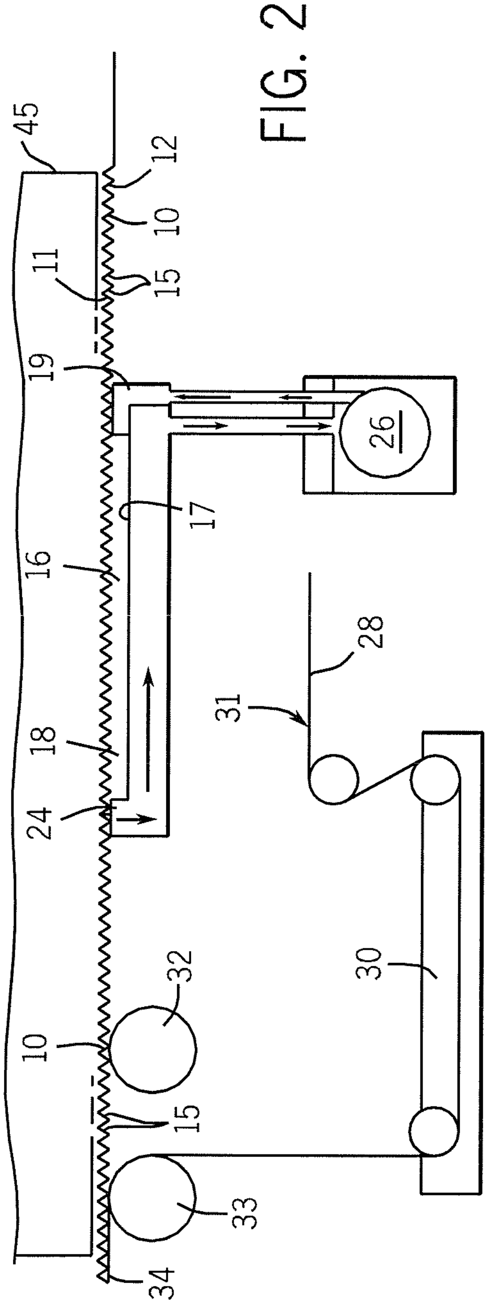
FIG. 2 is a side elevation schematic showing the FIG. 1 curing station and the curing station for the liner web.

Referring also to FIG. 2, a liner web 28, also impregnated with an A-phase phenolic resin and dried to the B-phase, is directed with a liner conveyor 31 through a second bath 30 of molten metal alloy. The liner web 28 is cured in a similar manner whereby the phenolic resin is converted to the final C-phase and fully cured. A suitable waterproof adhesive is supplied to the tips of the flutes 15 by an adhesive applicator roll 32 while the medium web 10 remains carried on the underside of the upper conveyor 11. One suitable adhesive is a hot melt polyamide. The glued flute tips are joined to the cured liner web 28 on a contact roll 33 to form a fully cured single face web 34.

Figure 3:
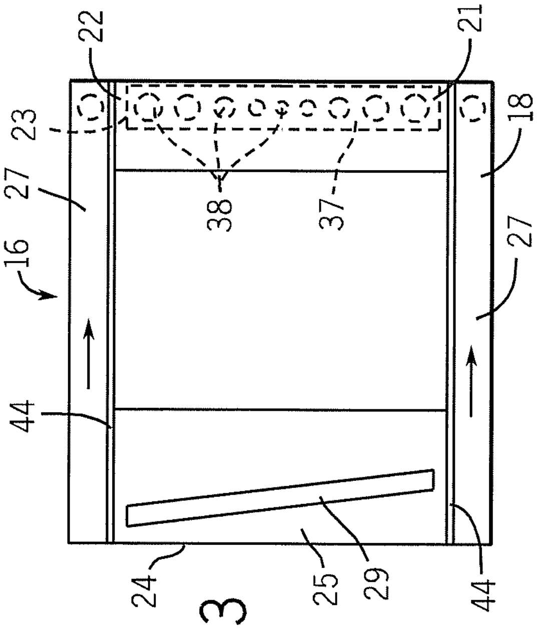
FIG. 3 is a schematic top plan view of the curing bath for the corrugated web shown in FIGS. 1 and 2.
Figure 4:
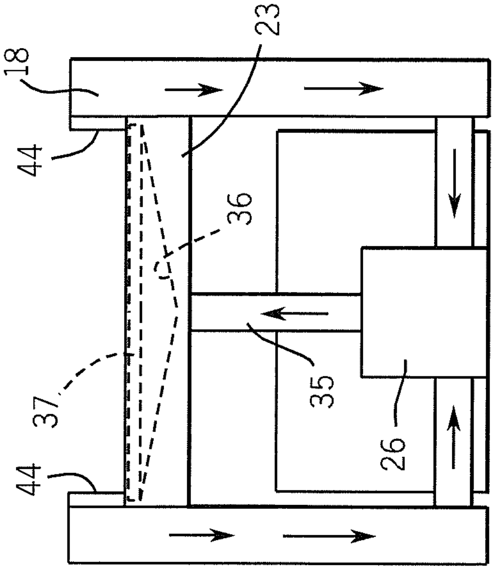
FIG. 4 is an upstream end elevation of the alloy supply header.
Figure 6:
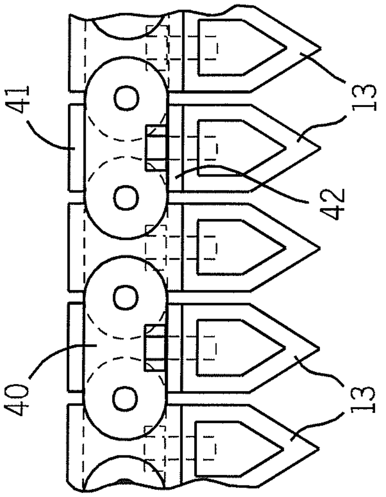
FIG. 6 is a side elevation detail of the fluting conveyor shown in FIG. 5.

FIGS. 3 and 4 show details of the molten alloy bath 16. The alloy return lines 27 are connected beneath the bath to a center alloy supply tube 35 connected to the alloy supply header 21. The supply header includes the distribution reservoir 23 which, as shown best in FIG. 4, includes an upwardly sloping lower wall 36 and an upper wall 37 that is provided with a pattern of outlet holes 38 that increase in size from the center laterally in both directions. This arrangement assures uniform distribution of the molten metal alloy across the entire width of the bottom wall 17 of the bath.

Figure 5:
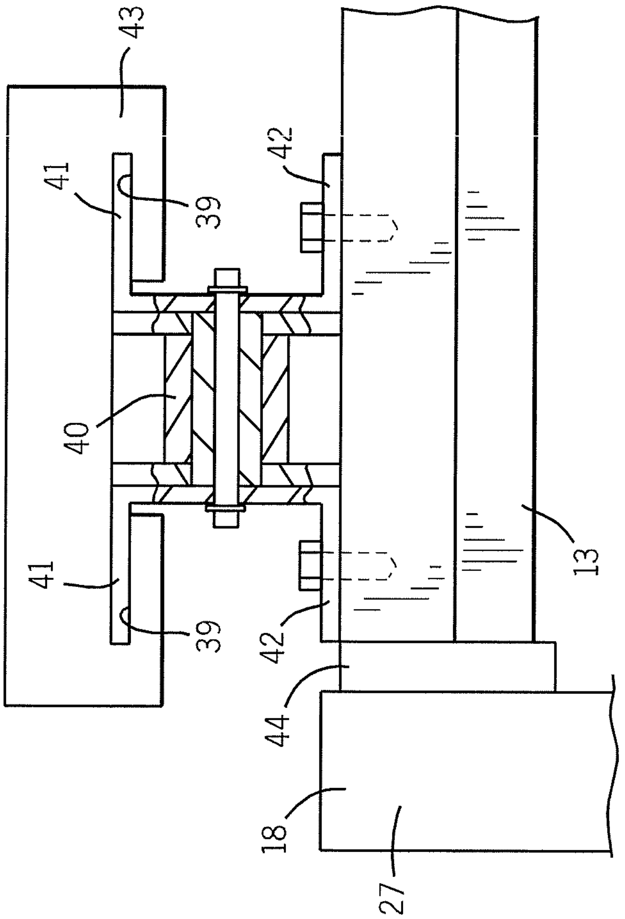
FIG. 5 is an enlarged schematic sectional view of the support and transfer arrangement for the web fluting conveyor.

As shown schematically in FIG. 5, the conveyor flights 13, which preferably comprise aluminum extrusions, are carried on a plurality of parallel laterally spaced roller chains 40 to which are attached pairs of oppositely extending upper and lower C-shaped attachments, each having horizontal mounting legs 41 and 42, respectively. The lower mounting legs 42 are secured to the flights 13 and the upper legs 41 are captured in slots 39 in a low friction plastic bearing rail 43. The bearing rail is preferably made of PTFE.

In order to inhibit leakage of the molten alloy between the conveyor 11 and the side walls 18 of the bath, the inner surface along the upper edge of each side wall is provided with a sealing strip 44 against which the opposite ends of the flights 13 of the upper conveyor 11 bear in operation. The sealing strip may be seen in FIGS. 1 and 3-5. It is preferable to apply a vacuum to the upper corrugating conveyor 11 to aid in holding the corrugated medium web 10 in intimate contact with the conveyor flights 13. One means of providing vacuum is to support the conveyor 11, via the bearing rails 43, on the underside of a vacuum plenum 45, as shown schematically in FIG. 2. The conveyor flights 13 are attached to the carrying roller chains 40 such that the faces of adjacent flights 13 are spaced apart slightly, thereby allowing the vacuum to be applied directly to the corrugated medium web 10. The sealing strip 44 also assists in sealing against vacuum loss.

Figure 7:
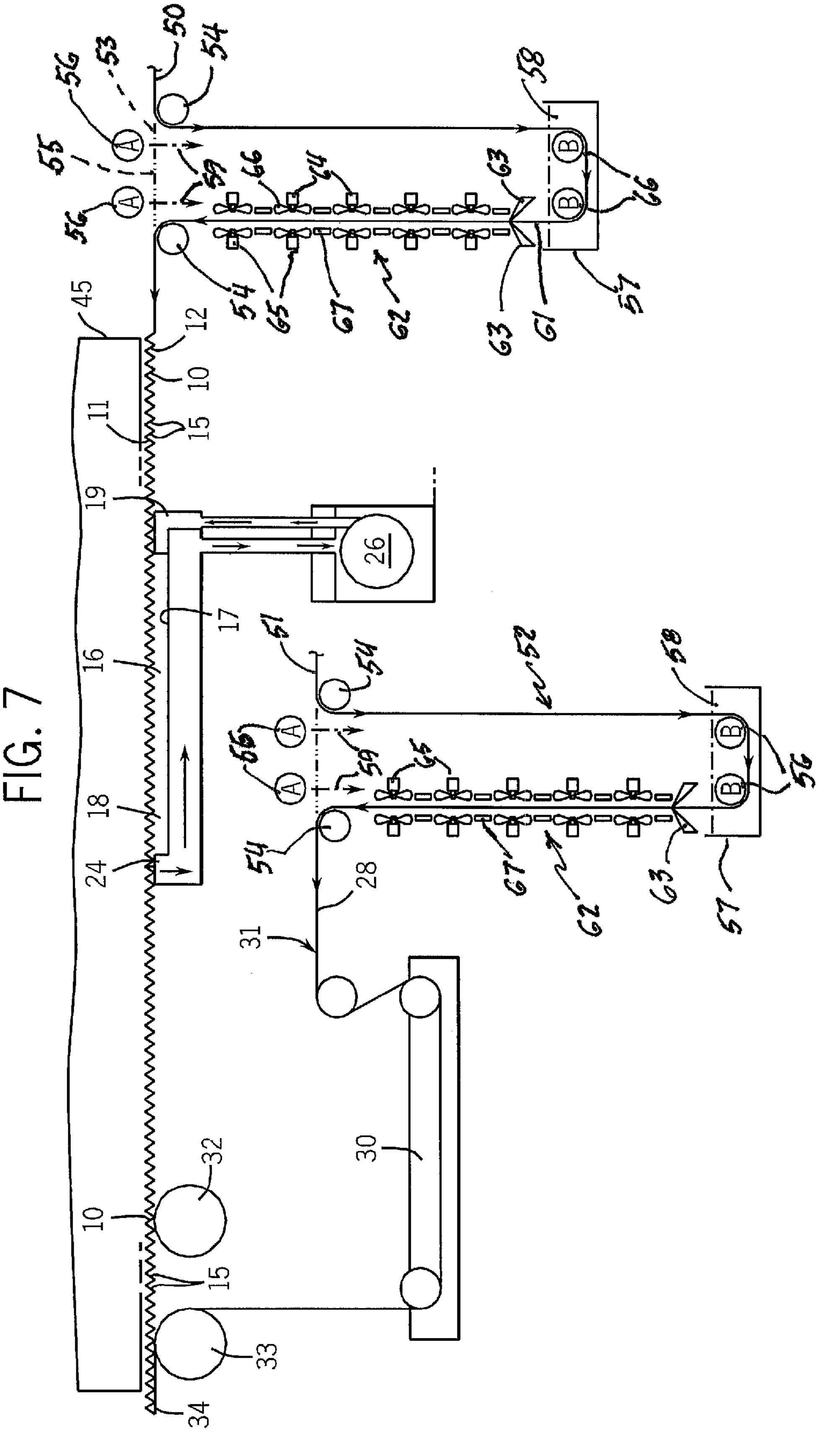
FIG. 7 is a side elevation schematic, similar to FIG. 2, additionally showing the web coating and impregnation stations.

Referring also to FIG. 7, the apparatus and method of the present invention are shown in an expanded embodiment wherein the web coating and resin impregnation of the webs, followed by drying, corrugating of one web, and curing are shown. Thus, the output single face web 34 is formed from an input paper medium web 50 and an input paper liner web 51. Each of the webs 50 and 51 is shown being processed through a separate web coating and drying apparatus 52 which are identical.

Referring first to the processing of the medium web 50, a web infeed device 53 includes a pair of spaced supporting rolls 54 over which the running web 50 travels horizontally in a thread-up position 55 as shown in phantom in the drawing. A pair of positioning rolls 56 is mounted between and parallel to the supporting rolls 54, the positioning rolls being held above the running web when the web is in the thread-up position 55. When it is desired to commence coating the web 50 for waterproofing with a liquid phenolic resin, the positioning rolls 56 are moved vertically downwardly on a vertical translating device 59 from their A position into engagement with the running medium web 50 and carrying the web downwardly to a B position immersed in a first bath 57 of an A-phase liquid phenolic resin 58. In the bath, the web contacts the liquid resin 58 between an upstream untreated web input run 60 and a downstream coated web output run 61.

The medium web 50 exists the resin bath 57 and travels vertically through a drying zone 62, the first portion of which comprises a squeegee device 63 to wipe excess liquid resin from the web before drying. The web output run 61 travels through the drying zone 62 between a series of vertically spaced driers 64 on opposite sides of the coated web output run 61. The driers 64 may conveniently comprise infrared heaters 65 and forced air fans 66. To bring the drying zone 62 into operation, as at system startup, the web 50 is first moved from the thread-up position 55 with the positioning rolls 56 in the A position vertically downward into the resin bath 57 on the vertical translating device 59 to the B position of the positioning rolls. Then, the dryer 64 and squeegee device 63 are moved from an initial position laterally outside the path of the running web on a horizontal translating device 67 into the drying zone 62 with the web in the coating position, as shown.

As previously described with respect to other embodiments, the web 50 exiting the coating and drying apparatus 52 is dried to the B-phase, but not fully cured. The dried medium web passes through a corrugator comprising upper and lower corrugating conveyors 11 and 12 and then into a first heated bath 16 of a low melting point metal alloy where the phenolic resin is cured to the C-phase.

Simultaneously, the liner web 51 is being separately coated and impregnated with a liquid A-phase phenolic resin in the web coating and drying apparatus 52 in the same manner and with the same apparatus as described above for the medium web 50. The dry liner web 28 travels into and through the second molten alloy bath 30 from which it exists as a fully cured liner web, which is combined with the fully cured corrugated medium web 50 in a conventional single facer apparatus 68.

What is claimed is:

1. An apparatus for curing a fluted paper web impregnated with an A-phase phenolic resin and dried to a partially cured B-phase, the apparatus comprising:

a heated bath for holding a molten low melting point metal alloy, the bath having a bottom wall, opposite side walls extending vertically upward from the bottom wall and defining upper edges of the bath, an upstream alloy supply header extending between the side walls and having a horizontal upper edge below the upper edges and defining a molten metal distribution reservoir, and a downstream weir dam having a horizontal upper edge coplanar with the upper edge of the supply header and defining a trough for receipt of molten metal alloy overflowing the weir dam;

a pump for supplying the molten metal alloy to the upstream supply header and for returning molten metal to the header from the downstream trough in a closed circuit; and, a web conveyor comprising a plurality of interconnected articulated flights shaped to form and adapted to carry the fluted web on the underside thereof, the web conveyor and the web carried thereon adapted to run through the molten metal bath between the side walls and over the horizontal upper edges of the supply header and the weir dam.

2. The apparatus as set forth in claim 1 wherein the molten metal distribution reservoir comprises an inlet for molten metal alloy centered between the side walls of the bath, and a distribution manifold adapted to equalize the distribution of the molten alloy returned by the pump laterally across the length of the manifold.

3. The apparatus as set forth in claim 2 wherein the distribution manifold comprises symmetric patterns of alloy feed holes extending laterally in opposite directions from the center inlet.

4. The apparatus as set forth in claim 1 wherein the conveyor flights are heated to preheat the web.

5. The apparatus as set forth in claim 4 wherein the flights comprise aluminum extrusions.

6. The apparatus as set forth in claim 1 including a continuous sealing strip between the side walls and the lateral edges of the conveyor.

7. The apparatus as set forth in claim 6 wherein the sealing strips comprise low friction plastic strips attached to the sidewall.

* * * * *